(12) United States Patent
Catovic et al.

(10) Patent No.: US 8,098,590 B2
(45) Date of Patent: Jan. 17, 2012

(54) APPARATUS AND METHOD FOR GENERATING PERFORMANCE MEASUREMENTS IN WIRELESS NETWORKS

(75) Inventors: Amer Catovic, San Diego, CA (US); Jay F. Dills, San Diego, CA (US); Mukesh K. Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 12/433,625

(22) Filed: Apr. 30, 2009

(65) Prior Publication Data

US 2009/0310501 A1    Dec. 17, 2009

Related U.S. Application Data

(60) Provisional application No. 61/061,489, filed on Jun. 13, 2008.

(51) Int. Cl.
*H04L 12/26* (2006.01)
*H04W 4/02* (2009.01)
*H04B 17/00* (2006.01)

(52) U.S. Cl. ............... 370/252; 370/338; 455/67.11; 455/456.1

(58) Field of Classification Search ............... 370/254, 370/252, 328, 338, 331–332; 455/67.11, 455/456.1, 436, 432.1, 456.2, 456.11
See application file for complete search history.

(56) References Cited

U.S. PATENT DOCUMENTS

| | | | | |
|---|---|---|---|---|
| 6,137,991 A * | 10/2000 | Isaksson | ............... | 455/67.11 |
| 6,275,703 B1 * | 8/2001 | Kalev | ............... | 455/436 |
| 7,155,244 B2 * | 12/2006 | Edge | ............... | 455/502 |
| 7,158,790 B1 * | 1/2007 | Elliott | ............... | 455/446 |
| 7,167,681 B2 * | 1/2007 | Kuurne et al. | ............... | 455/67.11 |
| 7,280,803 B2 | 10/2007 | Nelson | | |
| 7,546,111 B2 * | 6/2009 | Nakano | ............... | 455/404.1 |
| 7,657,288 B2 * | 2/2010 | Chitrapu et al. | ............... | 455/562.1 |

(Continued)

FOREIGN PATENT DOCUMENTS

| | | |
|---|---|---|
| EP | 1626596 A1 | 2/2006 |
| WO | WO03010987 A1 | 2/2003 |
| WO | WO 2005/004514 A1 * | 1/2005 |

OTHER PUBLICATIONS

International Search Report & Written Opinion—PCT/US2009/046626, International Search Authority—European Patent Office—Oct. 22, 2009.

*Primary Examiner* — Kwang B Yao
*Assistant Examiner* — Candal Elpenord
(74) *Attorney, Agent, or Firm* — Abdollah Katab; John J. Ketchum

(57) ABSTRACT

A method and apparatus for generating performance measurements for a wireless network is provided. The method may comprise: obtaining, at a base station, performance measurements and location data from a mobile device, storing, at the base station and based on the location data, at least a portion of the obtained measurements to at least one virtual geographic bin of a storage array, wherein each virtual geographic bin corresponds to a different geographic area within a cell serviced by the base station, aggregating, at the base station, at least a portion the measurements stored in each virtual geographic bin into one or more location-based performance measurements, and transmitting, from the base station, at least a portion of the location-based performance measurements to a network manager.

62 Claims, 7 Drawing Sheets

U.S. PATENT DOCUMENTS

| | | | |
|---|---|---|---|
| 2002/0082036 A1* | 6/2002 | Ida et al. | 455/522 |
| 2004/0198234 A1* | 10/2004 | Wacker et al. | 455/67.13 |
| 2006/0105759 A1* | 5/2006 | Betge-Brezetz et al. | 455/422.1 |
| 2006/0116120 A1* | 6/2006 | Hurst | 455/424 |
| 2008/0009244 A1* | 1/2008 | Lee | 455/69 |
| 2008/0248822 A1* | 10/2008 | Jarvinen et al. | 455/509 |
| 2009/0291692 A1* | 11/2009 | Kazmi et al. | 455/452.2 |

* cited by examiner

APPARATUS AND METHOD FOR GENERATING PERFORMANCE MEASUREMENTS IN WIRELESS NETWORKS

CLAIM OF PRIORITY UNDER 35 U.S.C. §119

The present Application for Patent claims priority to Provisional Application No. 61/061,489 entitled "Apparatus and Method for Generating Performance Measurements in Wireless Networks" filed Jun. 13, 2008, and assigned to the assignee hereof and hereby expressly incorporated by reference herein.

BACKGROUND

1. Field

The present aspects relate to wireless communication devices, and more particularly, to apparatus and methods for generating performance measurements in wireless networks.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can contemporaneously support communication for multiple mobile devices. Each mobile device can communicate with one or more network elements (e.g. base stations) via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Position determination within a wireless communication system enables a location for user equipment (e.g., mobile device, mobile communication apparatus, cellular device, smartphone, etc.) to be defined. In some aspects, a network can request or page the user equipment (UE), which can respond with such UE location information. This enables the location of the UE to be communicated and updated to the network.

Optimization of network coverage and service quality is a constant goal for wireless network operators. Superior coverage and service quality results in enhanced user experiences, greater throughput, and ultimately increased revenue. Network optimization conventionally requires measurements of network coverage and service quality as input. In the context of traditional network optimization, these measurements have been collected via data collection efforts performed manually across a network coverage area.

As manual collection can be costly and labor intensive, there have been ongoing efforts to provide for network self-optimization. Automation of measurement collection represents a crucial aspect of these efforts. Reporting by a UE may provide an important tool for automation of data collection. However, the volume of data that would need to be reported by the UEs to allow for network optimization calculations creates substantial difficulties for the network with electronic storage space and backhaul bandwidth. Consequently, it would be desirable to have a method and/or apparatus for collection of network measurements from one or more UEs but does not require substantial investment in backhaul bandwidth and electronic storage space in the network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with generating performance measurements for a wireless network. According to one aspect, a method for generating performance measurements for a wireless network is provided. The method can comprise obtaining, at a base station, performance measurements and location data from a mobile device, storing, at the base station and based on the location data, at least a portion of the obtained measurements to at least one virtual geographic bin of a storage array, wherein each virtual geographic bin corresponds to a different geographic area within a cell serviced by the base station, aggregating, at the base station, at least a portion the measurements stored in each virtual geographic bin into one or more location-based performance measurements, and transmitting, from the base station, at least a portion of the location-based performance measurements to a network manager.

Yet another aspect relates to at least one processor configured to display content on a communication device. The at least one processor can include a first module for obtaining, at a base station, performance measurements and location data from a mobile device, a second module for storing, at the base station and based on the location data, at least a portion of the obtained measurements to at least one virtual geographic bin of a storage array, wherein each virtual geographic bin corresponds to a different geographic area within a cell serviced by the base station, a third module for aggregating, at the base station, aggregating, at the base station, at least a portion the measurements stored in each virtual geographic bin into one or more location-based performance measurements, and a fourth module for transmitting, from the base station, at least a portion of the location-based performance measurements to a network manager.

Still another aspect relates to a computer program product comprising a computer-readable medium. The computer-readable medium can include a first set of codes for causing a computer to obtain performance measurements and location data from a mobile device, a second set of codes for causing the computer to store at least a portion of the obtained measurements to at least one virtual geographic bin of a storage array based on the location data, wherein each virtual geographic bin corresponds to a different geographic area within a cell serviced by the base station, a third set of codes for causing the computer to aggregate at least a portion the measurements stored in each virtual geographic bin into one or more location-based performance measurements, and a fourth set of codes for causing the computer to transmit at least a portion of the location-based performance measurements to a network manager.

Yet another aspect relates to an apparatus. The apparatus can include means for obtaining, at a base station, performance measurements and location data from a mobile device, means for storing, at the base station and based on the location data, at least a portion of the obtained measurements to at least one virtual geographic bin of a storage array, wherein each virtual geographic bin corresponds to a different geographic area within a cell serviced by the base station, means for aggregating, at the base station, at least a portion the measurements stored in each virtual geographic bin into one or more location-based performance measurements, and means for transmitting, from the base station, at least a portion of the location-based performance measurements to a network manager.

Another aspect relates to an apparatus. The apparatus can include a receiver operable to obtain performance measurements and location data from a mobile device, a storage module operable to store at least a portion of the obtained measurements to at least one virtual geographic bin of a storage array based on the location data, wherein each virtual geographic bin corresponds to a different geographic area within a cell serviced by the base station, a processing module operable to aggregate at least a portion the measurements stored in each virtual geographic bin into one or more location-based performance measurements, and a transmitter operable to transmit at least a portion of the location-based performance measurements to a network manager.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In some aspects, a wireless communication system may enable a network to request one or more UEs to measure and report at least quality of network coverage and service along with location information to the network. Further, this request may be using existing standardized capabilities of a wireless communication system to obtain measurement and location.

Figure 1:
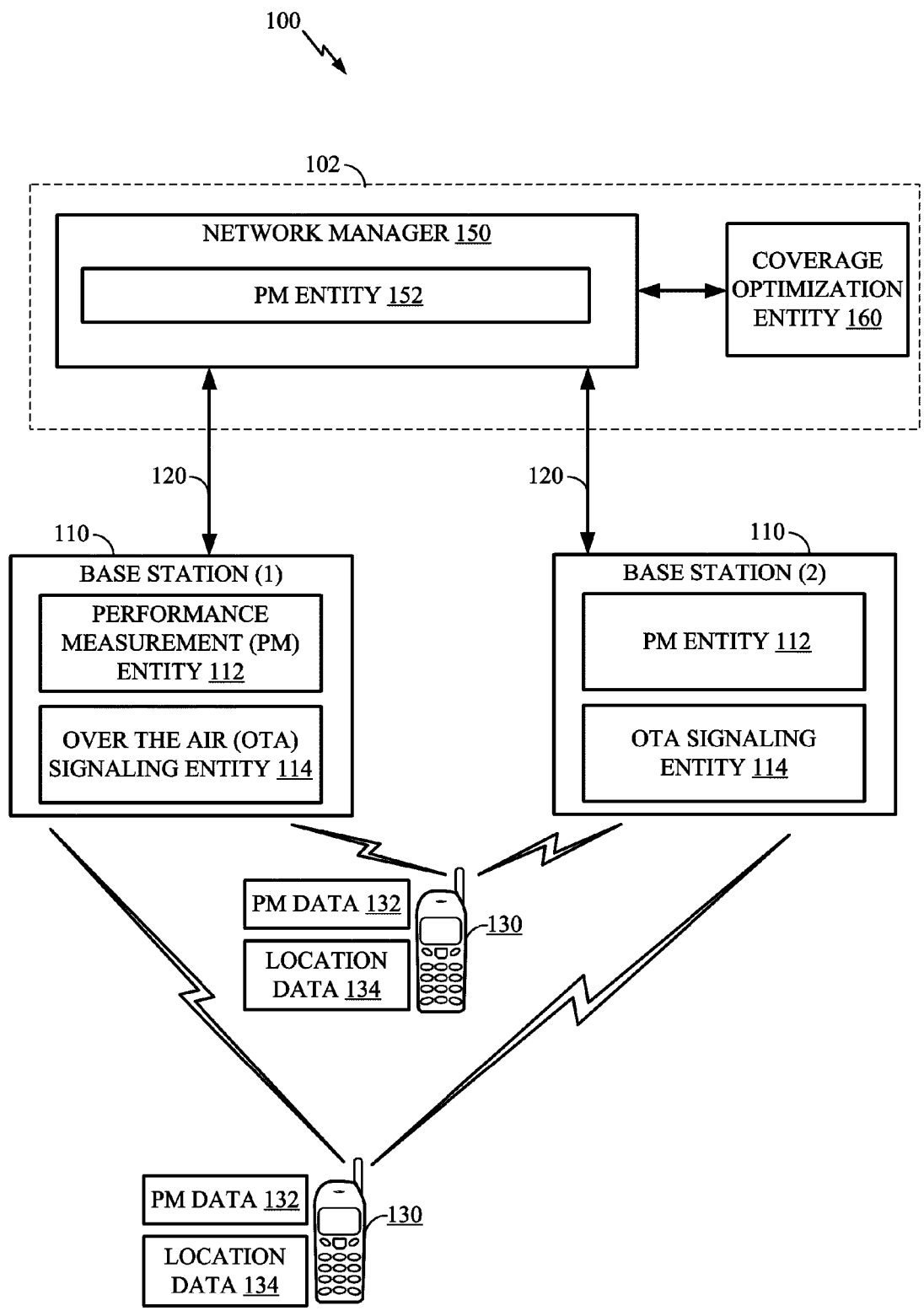
FIG. 1 illustrates a block diagram depicting an exemplary multiple access wireless communication system according to an aspect

With reference to FIG. 1, a wireless communication system 100 is illustrated in accordance with various aspects presented herein. The wireless communication system 100 includes a Network Operation, Administration, Management and Provisioning (OAM&P) System 102, one or more of wireless devices 130, one or more of network elements (e.g. eNodeB's or base stations) 110, and one or more backhaul network interfaces 120 for communication between network elements and OAM&P System.

OAM&P System 102 may include a network manager 150. In one aspect, OAM&P system may also include coverage optimization entity (COE) 160. In another aspect, the COE 160 may be an entity external to OAM&P but operable to communicate therewith. The COE 160 may receive from a network manager one or more inputs reflecting network coverage and service quality. In another aspect, the COE 160 may receive these inputs from network elements 110 either directly or via the OAM&P system 102. Based at least in part on the inputs the COE 160 executes coverage optimization algorithms and provides recommendations about configuration changes necessary to optimize the network coverage (e.g. antenna tilt, azimuth changes, etc.).

The network manager 150 may include a performance measurements entity 152. In one aspect, performance measurements entity 152 may be operable to receive location-based performance measurements from a plurality of network elements 110 over backhaul network interfaces 120 and further organize the data contained therein prior to any use of said data by COE 160. For example, multiple network elements may be present in a predetermined geographic region of interest. In such an instance, the performance measurements entity 152 may aggregate the location-based performance measurements received from network elements 110 to generate a more complete profile of the geographic region of interest.

The wireless devices 130 can be, for example, cellular phones, smart phones, laptops, handheld communication devices, handheld computing devices, satellite radios, global positioning systems, PDAs, and/or any other suitable device for communicating over wireless communication system 100. The wireless devices 130 collect performance measurements 132. In one aspect, the wireless devices 130 collect performance measurements 132 based on the configuration received from the network. The measurements may include but are not limited to network coverage and service quality. The measurements 132 can be reported to the network, for example to network elements 110. The measurements can pertain to different measurement quantities, such as identification of detected base stations, signal strength and quality of detected base stations, transmitted power of the wireless devices, and location information 134 of the wireless device 130 at the time when the performance measurement was sent to the network elements 110. The wireless devices 130 can supply the measurements to the network elements 110 via standardized over the air (OTA) protocols, such as RRC protocol, specified in 3GPP TS 25.311 and TS 36.331.

The network elements (e.g. base stations, NodeBs, enhanced NodeBs) 110 may configure the measurements to be collected and reported by the wireless devices 130, including types of measurements and reporting mechanisms, such as periodic or event-triggered reporting. The network elements 110 may obtain the measurements reported from the wireless devices 130. However, supplying the raw measurements to the OAM&P system 102 would generate a large amount of backhaul traffic over backhaul network interfaces 120. Furthermore, storing raw measurements for later processing and use in the network optimization process would require large amount of storage space in network elements and/or in the OAM&P system. Therefore, the network elements 110 may generate aggregations of measurements reported by one or more wireless devices 130 corresponding to storage arrays made up of virtual geographic storage bins corresponding to wireless device 130 locations. In one aspect, these aggregations are referred to as location-based performance measurements. Location-based performance measurements may be computed across all measurements or a portion of measurements in each virtual geographic storage bin collected during certain period of time, such as 24 hours, until a triggering event occurs or the like.

For example, a base station 110 may receive measurement reports from one hundred connected wireless devices 130, each wireless device 130 sending one measurement reports every five seconds, each report containing location information and received signal strength measurements of five different base stations 110. Assuming the size of one measurement report is 100 bytes large (800 bits), the total traffic that would be generated by transmitting all received measurement reports over backhaul network interfaces 120 would be 2 kilobytes per second (16 kilobits per second) or 2.88 Megabytes per day per network element. Using location-based performance measurements, the base station 110 could divide its coverage area into 1000 virtual geographic bins and compute average received signal strength in each bin based on measurements received from wireless devices located inside that bin over a period of 24 hours. Assuming that all bins get visited by at least one connected mobile device 130 within 24 hours, there will be five location-based performance measurements generated each 24 hours for each of the 1,000 virtual geographic bins, one location-based performance measurement for each of the five base stations. Assuming one location-based performance measurement is 100 bytes large, the total amount of data generated in this way is then 100 kilobytes per day. This corresponds to nearly thirty-fold reduction in backhaul traffic and storage requirements. Furthermore, if the number of virtual geographic bins were smaller, the reduction would be correspondingly larger.

Location-based performance measurements may then be supplied to the network manager 150 and COE 160 over backhaul network interfaces 120. Therefore, instead of providing a multitude of measurement reports from wireless devices 130 at possibly random interval in time, location-based performance measurements allow summarizing the multitude of measurement reports from wireless devices 130 into a condensed form and transmitting this condensed form at a predetermined time. As such, aggregating measurement reports from wireless devices into location-based performance measurements at the network elements not only reduces backhaul traffic, but may also provide a level of predictability as to when performance data traffic may be transmitted, allowing for better planning of backhaul bandwidth. In addition, location-based performance measurements may also provide a high level of predictabilty and configurability of storage reqirements, since storage reqirements for location-based performance measurements are not dependent on the number of wireless devices reporting measurements, reporting duration or size of the reports. In one aspect, location-based performance measurements only depend on the number of virtual geographic bins.

Network element 110 may further include performance measurement entity 112 and OTA signaling entity 114. In one aspect, OTA signaling entity 114 may configure measurements to be performed by wireless devices 130, such as signal strength and quality of detected base stations 110, types of base station 110 to be included or exluded from measurements, transmitted power of the wireless devices, etc. In one aspect, OTA signaling entity 114 may configure the measurement reporting policy, including the reporting interval for periodic reporting or report triggering events for event-triggered reporting. In another aspect, OTA signaling entity 114 may be configured to receive raw measurement data 132 and device location data 134 from wireless devices 130. Furthermore, the received measurements data 132 and location data 134 may be analyzed by performance measurements entity 112. In one aspect, performance measurements entity 112 may generate coverage and service quality statistics through binning and storing various components of the received measurement data 132 according to virtual bins in a storage array, where the virtual bins may be defined by geographic area, time of received data, measurement quantity, identity of the base station or a plurality of base stations whose coverage and service quality has been measured, or any combination of these factors. Performance measurement entity 112 may aggregate the measurement data in each virtual bin by computing statistics of the coverage and service quality data assigned to each bin. In one aspect, these coverage and service statistics may be referenced to as called location-based performance measurements, each location-based performance measurement corresponding to a statistics computed from at least a portion of measurements assigned to at least one virtual bin. In one aspect, location-based performance measurements can reflect plurality of statistics computed for each measurement quantity, for example: probability density function (PDF) or cumulative distribution function (CDF) of signal or service quality, maximum signal or service quality, minimum signal or service quality, average signal or service quality (dB, linear), and standard deviation of the signal or service quality (dB, linear). For example, location-based performance measurements can include, but are not limited to, the average received signal code power (RSCP) for Universal Mobile Telecommunications System (UMTS) or reference signal received power (RSRP) for Third Generation Long Term Evolution (LTE) systems, average Ec/Io (UMTS)/RSRQ (LTE), average block error rate for voice service, and maximum wireless device and Tx Power for the voice service, etc.

In one aspect, mobile devices 130 may be manufactured and operated by various vendors, service providers, etc. Furthermore, OAM&P System 102 may be associated with yet another vendor, service provider, etc. In such aspects, location-based performance measurements generated at network elements 110 may reflect measurements from all mobile devices 130 manufactured or being serviced by any of the various vendors and/or operators without revealing the performance of any particular category of mobile devices 130 and/or irrespective of ownership or service providership agreements. Therefore, location-based performance measurements may include data from mobile devices 130 associated with various vendors and may be combined to form a more complete picture of network performance.

Additionally, as the location-based performance measurements are aggregated at the network elements 110, no additional software or the like is required for mobile devices 130, which greatly facilitates network self-optimization.

As noted supra, the COE 160 can execute coverage optimization algorithms and provide recommendations about configuration changes necessary to optimize the network coverage (e.g. antenna tilt, azimuth changes, etc.) based at least in part on the received, aggregated coverage statistics contained in location-based performance measurements. Additionally, location-based performance measurements can be used in other aspects of network planning, including: capacity dimensioning, and budget planning.

Figure 2:
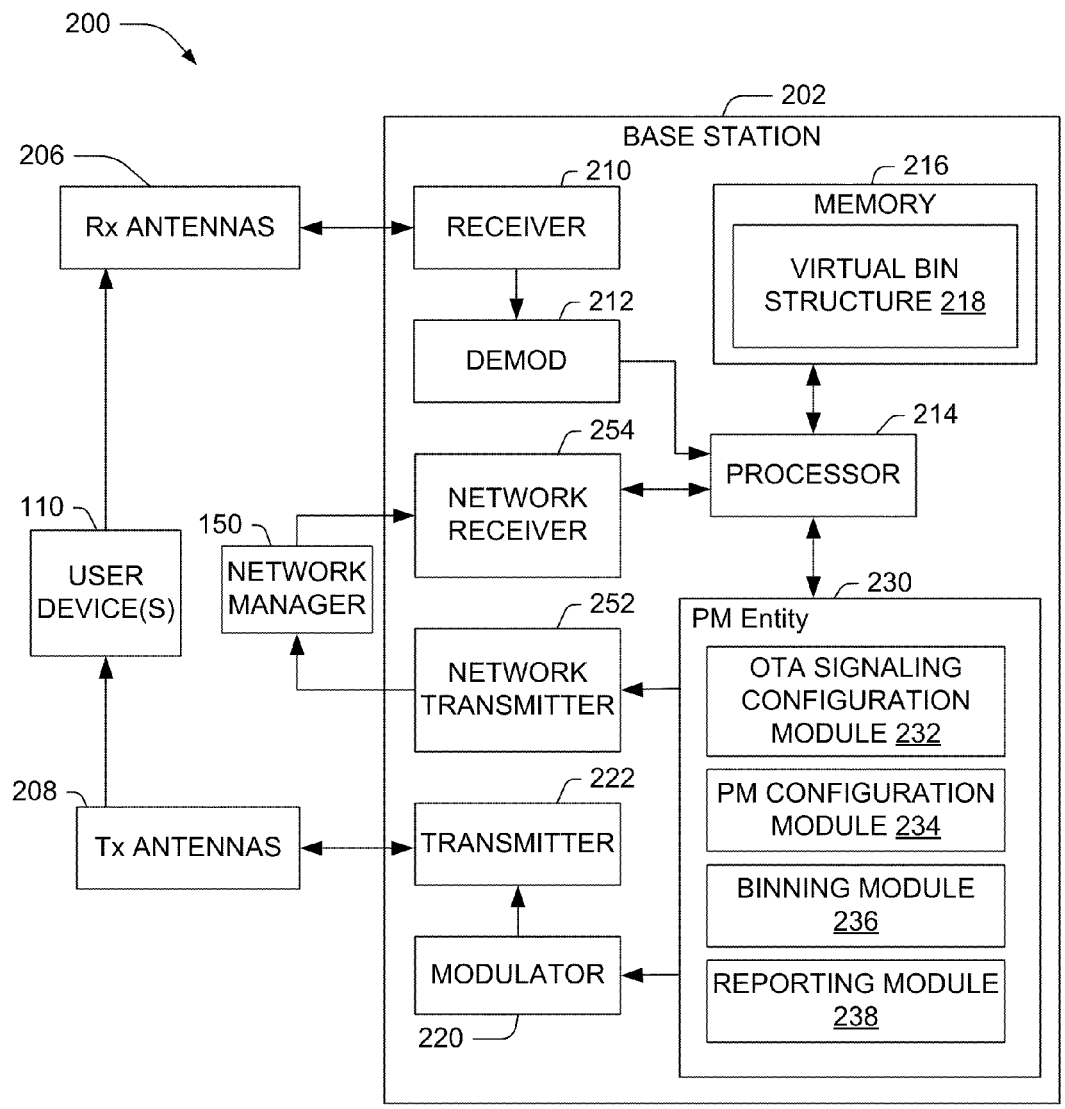
FIG. 2 is a block diagram depicting an exemplary architecture of a base station configured to generate performance measurements for a wireless network.

With reference to FIG. 2, an example system 200 that comprises a base station 202 with a receiver 210 that receives signal(s) from one or more user devices 110 through a plurality of receive antennas 206, and a transmitter 222 that transmits to the one or more user devices 110 and/or to one or more network managers 150 through a transmit antenna 208. Furthermore, base station 202 comprises network receiver 254 that may receive signal(s) from one or more network managers 150 through a connection, such as but not limited to, a wired backhaul connection, etc. Receiver 210 can receive information from receive antennas 206 and is operatively associated with a demodulator 212 that demodulates received information. Demodulated symbols are analyzed by a processor 214, and which is coupled to a memory 216 that stores, among other items, information related to mobile device performance measurements and location. Processor 214 can be a processor dedicated to analyzing information received by receiver 210 and/or generating information for transmission by a transmitter 222, a processor that controls one or more components of base station 202, and/or a processor that both analyzes information received by receiver 210, generates information for transmission by transmitter 222, and controls one or more components of base station 202. As noted above, base station 202 can additionally comprise memory 216 that is operatively coupled to processor 214 and which stores, among other items, mobile device location-based performance measurements. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 216 of the subject apparatus and methods is intended to comprise, without being limited to, these and any other suitable types of memory.

Furthermore, in one aspect, memory 216 can include virtual bin structure 218 to facilitate organizing stored information related to mobile device performance measurements and location. Virtual bin structure 218 may include a storage array organized by one or more of performance measurement information, mobile device location information, and/or time of reception of data. For example, a virtual bin structure 218 may be organized into bins corresponding to geographic regions within the coverage area of the base station 202, with a separate virtual bin for different types of measurements. As such, measurement data received from a mobile device is stored in the virtual bin corresponding to the location of the device when it transmitted the data. In another example, a virtual bin structure 218 may be organized into bins corresponding to time of data entry. As such, measurement data received from a mobile device may be stored in the virtual bin corresponding to when the device transmitted the data.

Processor 214 is further coupled to performance measurement entity 230. Performance measurement entity 230 may include OTA signaling configuration module 232, performance measurements configuration module 234, binning module 236 and reporting module 238 In one aspect, OTA signaling entity 232 may configure measurements to be performed by wireless devices, such as signal strength and quality of detected base stations, types of base station to be included or exluded from measurements, transmitted power of the wireless devices, etc. In one aspect, OTA signaling entity 232 may configure the measurement reporting policy, including the reporting interval for periodic reporting or report triggering events for event-triggered reporting. In another aspect, OTA signaling entity 232 may be configured to receive raw measurement data and device location data from wireless devices. Furthermore, the received measurements data and location data may be analyzed by performance measurements configuration module 234. Performance measurement configuration module 234 may aggregate the measurement data in each virtual bin by computing statistics of the coverage and service quality data assigned to each bin. In one aspect, these coverage and service statistics may be referenced to as called location-based performance measurements, each location-based performance measurement corresponding to a statistics computed from at least a portion of measurements assigned to at least one virtual bin. In one aspect, location-based performance measurements can reflect plurality of statistics computed for each measurement quantity, for example: probability density function (PDF) or cumulative distribution function (CDF) of signal or service quality, maximum signal or service quality, minimum signal or service quality, average signal or service quality (dB, linear), and standard deviation of the signal or service quality (dB, linear). For example, location-based performance measurements can include, but are not limited to, the average received signal code power (RSCP) for Universal Mobile Telecommunications System (UMTS) or reference signal received power (RSRP) for Third Generation Long Term Evolution (LTE) systems, average Ec/Io (UMTS)/RSRQ (LTE), average block error rate for voice service, and maximum wireless device and Tx Power for the voice service, etc. In one aspect, performance measurements configuration module 234 may be configured to select from the received measurements, a portion thereof which have been determined to be relevant. To avoid over taxing base station resources, the measurements configuration module 234 may select from a default set only those measurements which may be useful for a network manager 150, such as but not limited to, the average received signal code power (RSCP) for Universal Mobile Telecommunications System (UMTS) or reference signal received power (RSRP) for Third Generation Long Term Evolution (LTE) systems, average Ec/Io (UMTS)/RSRQ (LTE), average block error rate for voice service, and maximum wireless device and Tx Power for the voice service etc. In some aspects, performance measurements configuration module 234 generates location-based performance measurements that is based on one or a combination of received data.

In one aspect, binning module 236 may generate coverage and service quality statistics through binning and storing various components of the received measurement data according to virtual bins in a storage array, where the virtual bins may be defined by geographic area, time of received data, measurement quantity, identity of the base station or a plurality of base stations whose coverage and service quality has been measured, or any combination of these factors. In another aspect, Binning module 236 may be operable to obtain the selected and/or generated location-based performance measurements from the performance measurements configuration module 234, and store the selected data is virtual bin structure 218 according the to the wireless device 110 location, or time of entry or the like. Additionally, in one aspect, binning module 236 may selectively remove data that may individually identify the wireless device. In such an aspect, privacy concerns of a user may be alleviated as no individually identifying information is stored at the base station. In one aspect, binning module 236 may also aggregate data stored in the virtual bin structure for a set period of time, until a triggering event occurs, or the like. For example, a triggering event may include completion of: a predetermined time period, a predetermined number of wireless device entries having been received, a predetermined number of a specific type of measurement entries having been received, a predetermined amount of data collected (e.g. memory amount), or any combination thereof. In addition, a triggering event may include at least one of, a network manager request, or a situation in which at least one component of received measurement data or an aggregation thereof falls below or rises above a pre-configured threshold, or the like. In one aspect, reporting module 238 may obtain at least a portion of the aggregated data stored in the virtual bin structure 218 and may prepare the data for transmission to a network manager 150 or the like.

In one aspect, PM entity 230 data, such as but not limited to, data obtained from reporting module 238, may be transmitted to network manager 150 through network transmitter 252. In another aspect, a modulator 220 can multiplex a signal for transmission by a transmitter 222 through transmit antenna 208 to user devices 110 and/or to one or more network managers 150. As such, transmissions to a user device 110 and transmissions to a network manager 150 may be performed through different interfaces. For example, receiver 210 and transmitter 222 may communication with a mobile device 110 over the air, while network receiver 254 and network transmitter 252 may communicate through a wired backhaul connection.

Figure 3:
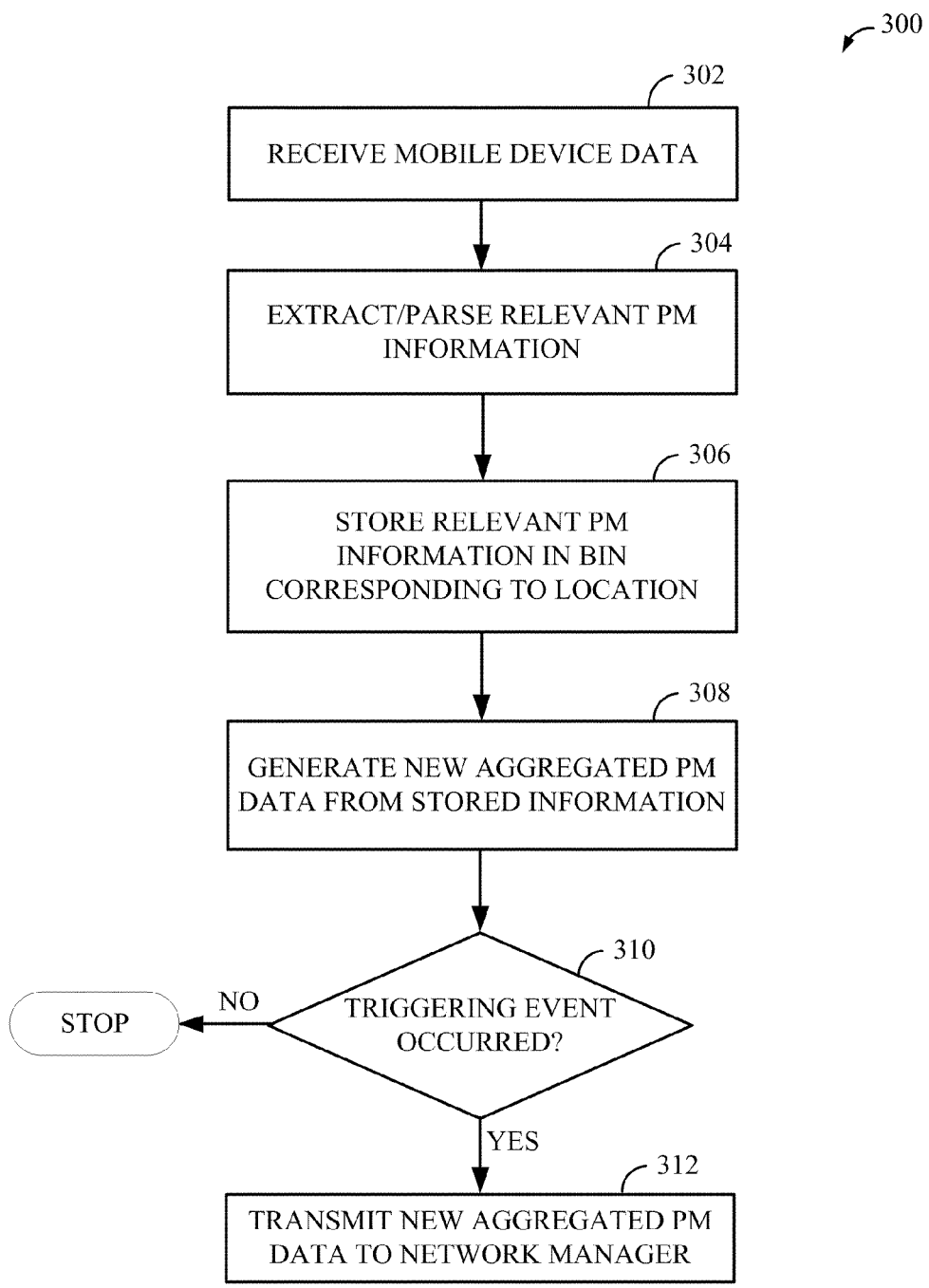
FIG. 3 is an exemplary method for generating performance measurements for a wireless network.

FIG. 3 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 3, an exemplary method 300 for generating location-based performance measurements for a wireless network is presented. At reference numeral 302, data is received from a wireless, mobile or the like, device. In one aspect, the data may include performance measurements such as network coverage and service quality and location data for the device. At reference numeral 304, relevant performance data and/or device location data is obtained or generated from the received data. For example, a mobile device may transmit performance measurement data such as but not limited to, the average received signal code power (RSCP) for Universal Mobile Telecommunications System (UMTS) or reference signal received power (RSRP) for Third Generation Long Term Evolution (LTE) systems, average Ec/Io (UMTS)/RSRQ (LTE), average block error rate for voice service, and wireless device Tx Power etc., along with location data. In one aspect, location data may include explicit location information, such as latitude and longitude and/or altitude, computed by a mobile device using reference signals and/or other information obtained from a system, such as but not limited to, a satellite system (e.g. GPS) or terrestrial network (e.g. Time of Arrival, Time Difference of Arrival or Angle Difference of Arrival), or a combination of the satellite and terrestrial network (e.g. Network-assisted GPS) or the like. In another aspect, location data may include location-related measurements reported by mobile devices, from which the network elements can compute the location of a mobile device. At reference numeral 306, the relevant performance data may be stored in a bin in a storage array. In one aspect, the storage array is organized with each bin corresponding to a predetermined geographic region. As such, the relevant performance data may be stored in a corresponding virtual geographic bin as defined by the location data. At reference numeral 308, data stored to a bin may be combined to generate new aggregated performance data with at least a portion of data that may already be present in the corresponding bin. Stored data may be aggregated in the bins to generate location-based performance measurements until a triggering event occurs. For example, a triggering event may include: a predetermined time period, a predetermined number of wireless device entries have been received, a predetermined number of a specific performance measurement entry have been received, a network manager request, or the like. If at reference numeral 312, a triggering event has not occurred at reference numeral 310, then data may continue to be collected and/or the process may stop. By contrast, if at reference numeral 312, a triggering event has occurred at reference numeral 310, then at least a portion of the location-based performance measurements stored in the virtual bin structure is transmitted to a network manager or the like.

Figure 4A:
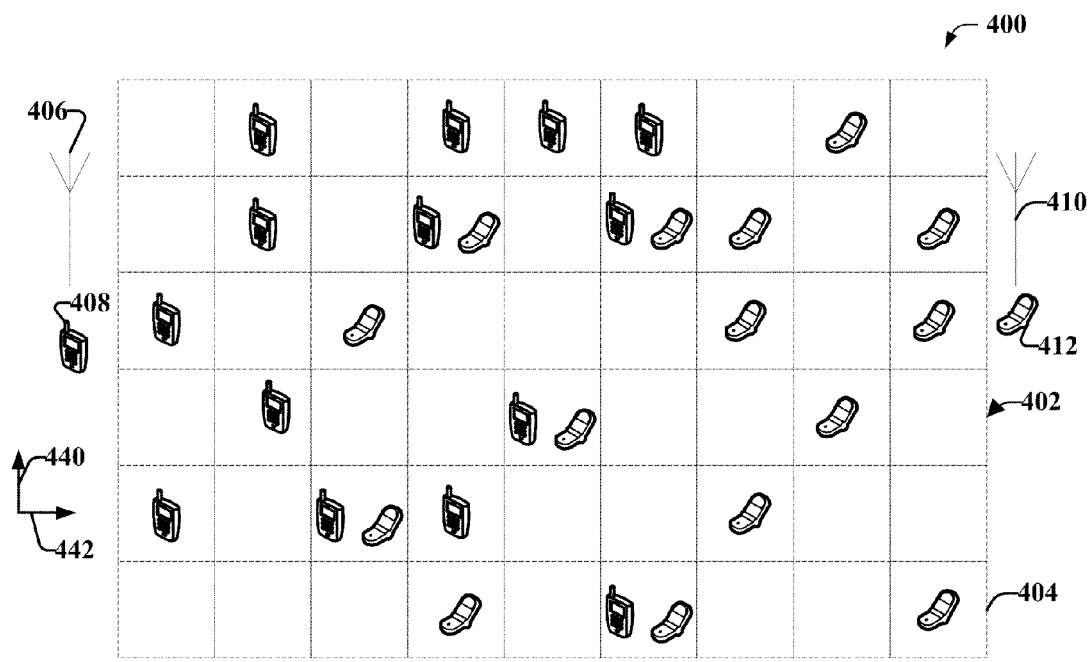
FIGS. 4A-C illustrate a wireless communication system in accordance with an aspect of the present invention
Figure 4C:
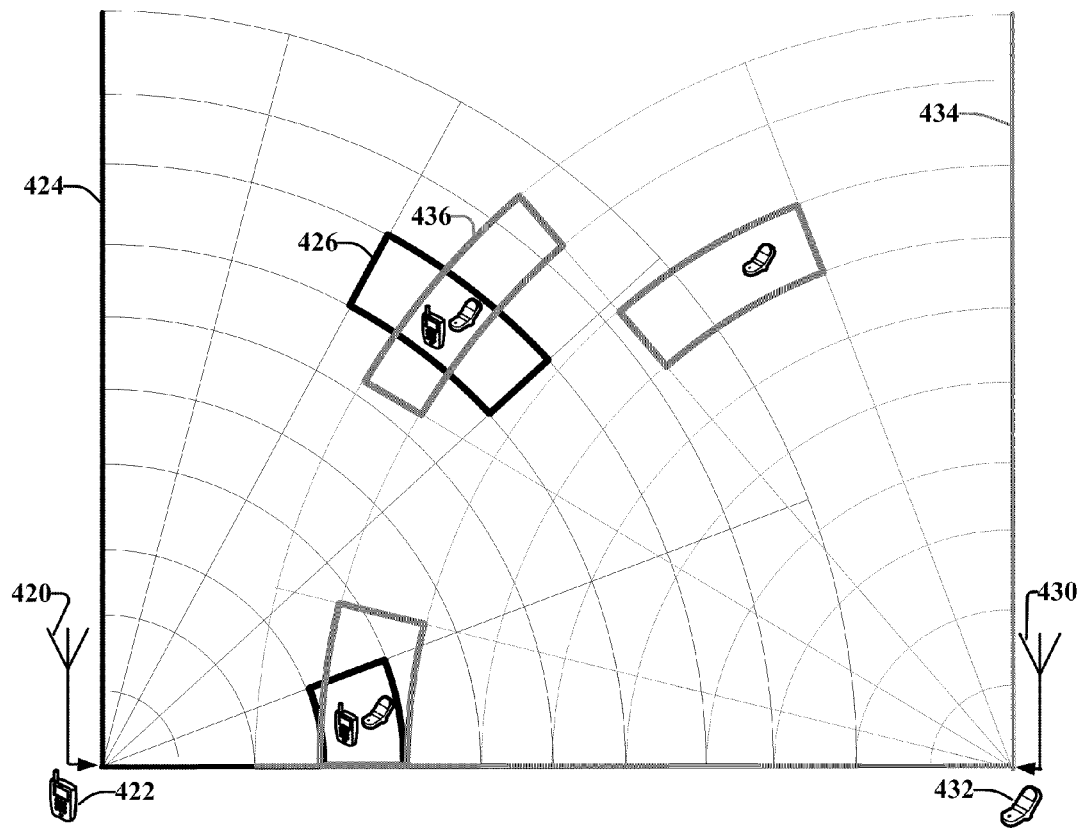
Figure 4B:
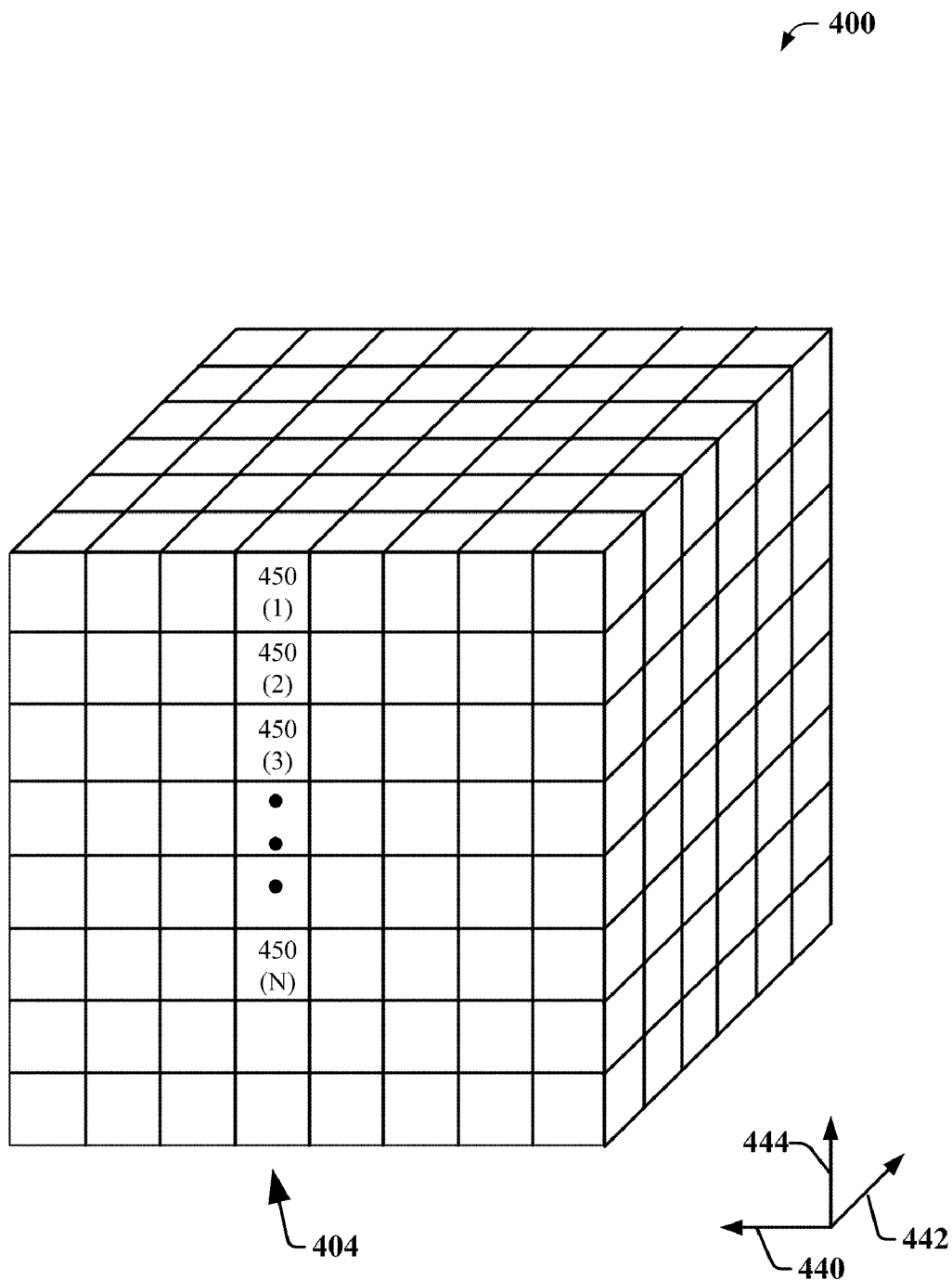

Referring now to FIGS. 4A through 4C, a wireless communication system 400 is illustrated in accordance with various aspects presented herein. With reference to FIG. 4A, the system 400 includes a coverage area 402. The coverage area 402 is virtually decomposed into geographical bins (e.g. 100 m×100 m) 404. As depicted, the coverage area 402 includes the plane defined through a first 440 and second 442 direction. In one aspect, the size of the bins 404 can be configured by a system operator or an infrastructure vendor. The size of the bins 404 can assist in determining a balance between the granularity of coverage information on the one hand and processing complexity and storage requirements on the other hand, wherein smaller bins 404 provide for greater granularity, and larger bins 404 provide for decreased processing complexity and storage requirements. In one aspect, bins 404 are uniformly sized over the coverage area 402, while in another aspect geographic points of interest may have bins 404 with varying size. For example, if a coverage area 402 spanned an urban and rural area, then bin sizing for the urban area may be smaller than the bin sizing for the rural area. In another example, if an area has demonstrated coverage problems in the past, smaller bins may be used in that area to attempt to more closely locate trouble spots.

In the depicted FIG. 4A, a first network element (e.g. base station) 406 is connected to a first set of wireless devices 408 located in the bins 404. A second network element (e.g. base station) 410 is connected to one or more wireless devices 412 located in the bins 404. As noted supra, the wireless devices 408 and 412 can collect raw performance measurements of network coverage and service quality and provide performance measurements to the network elements (e.g. base stations, nodeBs, etc.) 406 and 410, respectively. The performance measurements can include, for example, physical cell identification of detected cells, signal strength of detected cells, and location information (e.g. identification of bin 404) of the wireless devices 408 and 412 at the time when the performance measurement was sent to the network elements 406 and 410. The wireless devices 408 and 412 can supply the performance measurements to the network elements 406 and 410 via over the air protocols, such as RRC 25.311 and 26.331.

Wireless communication system 400 may be further illustrated with reference to FIG. 4B. As depicted in FIG. 4B, bins 404 may store raw performance measurements 450(1)-(n) from multiple wireless devices 408, 412 in a coverage area, such as coverage area 402. As further depicted, the coverage area includes the plane defined through a first 440 and second 442 direction. Further, storage of raw performance data in a bin 404 column is depicted with reference to a third 444 direction. In one aspect, the stored raw performance measurements 450(1)-(n) are added to columns defining bins 404 as they are obtained, such that the measurements are stacked over time. In another aspect, each layer in a column defining a bin 404 may correspond to a time period. In another aspect, each layer in a column may correspond to measurements or aggregation of measurements pertaining to one cell. In yet another aspect, each layer in a column may correspond to different measurement quantities such as RSRP, RSRQ for LTE systems, RSCP, Ec/Io for UMTS systems, UE transmit power, etc.

With reference to FIG. 4C, the system 400 includes coverage areas 422, 432. The coverage area 422, 432 are virtually decomposed into geographical bins 404 defined radially and angularly from a network element 420, 430. In one aspect, the size of the bins 426, 436 can be configured by a system 400 operator or an infrastructure vendor. The size of the bins 426, 436 can assist in determining a balance between the granularity of coverage information on the one hand and processing complexity and storage requirements on the other hand, wherein smaller bins 404 provide for greater granularity, and larger bins 404 provide for decreased processing complexity and storage requirements. In one aspect, bins 426, 436 are sized uniformly radially and angularly over the coverage areas 424, 434, while in another aspect geographic points of interest may have bins 426, 436 with varying size. For example, if a coverage area 420 spanned an urban and coverage area 430 spanned a rural area, then bin sizing for the urban coverage area 420 may be smaller than the bin sizing for the rural coverage area 430. In another example, if an area has demonstrated coverage problems in the past, smaller bins may be used in that area to attempt to more closely locate trouble spots.

In the depicted figure, a first network element (e.g. base station) 420 is connected to a first set of wireless devices 422 located in the bins 426. A second network element (e.g. base station) 430 is connected to one or more wireless devices 432 located in the bins 436. As noted supra, the wireless devices 422 and 432 can collect raw performance measurements of network coverage and service quality and provide performance measurements to the network elements (e.g. base stations, nodeBs, etc.) 420 and 430, respectively. The performance measurements can include, for example, physical cell identification of detected cells, signal strength of detected cells, and location information (e.g. identification of bin 426, 436) of the wireless devices 422 and 432 at the time when the performance measurement was sent to the network elements 420 and 430. The wireless devices 422 and 432 can supply the performance measurements to the network elements 420 and 430 via over the air protocols, such as RRC 25.311 and 26.331.

The network elements 406, 410, 420 and 430 can determine coverage statistics for their respective wireless devices 408, 412, 422, 432. The coverage statistics can be computed per bin 404, 426, 436 for each measurement quantity: probability density function (PDF) or cumulative distribution function (CDF) of signal quality, maximum signal quality, minimum signal quality, average signal quality (dB, linear), and standard deviation of the signal quality (dB, linear). The coverage statistics can be aggregated over any group of bins 404, 426, 436, over time, etc. The coverage statistics can include average RSCP (UMTS)/RSRP (LTE), average Ec/Io (UMTS)/RSRQ (LTE), average block error rate for voice service, and maximum wireless device 408, 412, 422 and 432 Tx Power for voice service.

Additionally, other coverage statistics can be computed in the same fashion based on the wireless device's 408, 412, 422, and 432 performance measurements, such as number of performance measurements received per bin 404, 426, 436, number of different wireless devices 408, 412, 422 and 432 reporting per bin 404, 426, 436, number of signaling connections per bin 404, 426, 436, block error rate per service bin 404, 426, 436, wireless device 408, 412, 422 and 432 Tx Power per service bin 404, 426, 436, and wireless device 408, 412, 422 and 432 buffer status per service bin 404, 426, 436.

As previously discussed, the coverage statistics may be communicated from the element managers 406, 410, 420, 430 to a coverage optimization entity (see FIG. 1) that can execute coverage optimization algorithms and provide recommendations about configuration changes necessary to optimize the coverage (e.g. antenna tilt, azimuth changes, etc.) based on the coverage statistics. Additionally, the coverage statistics can be used in other aspects of network planning, including: capacity dimensioning, and network planning.

Figure 5:
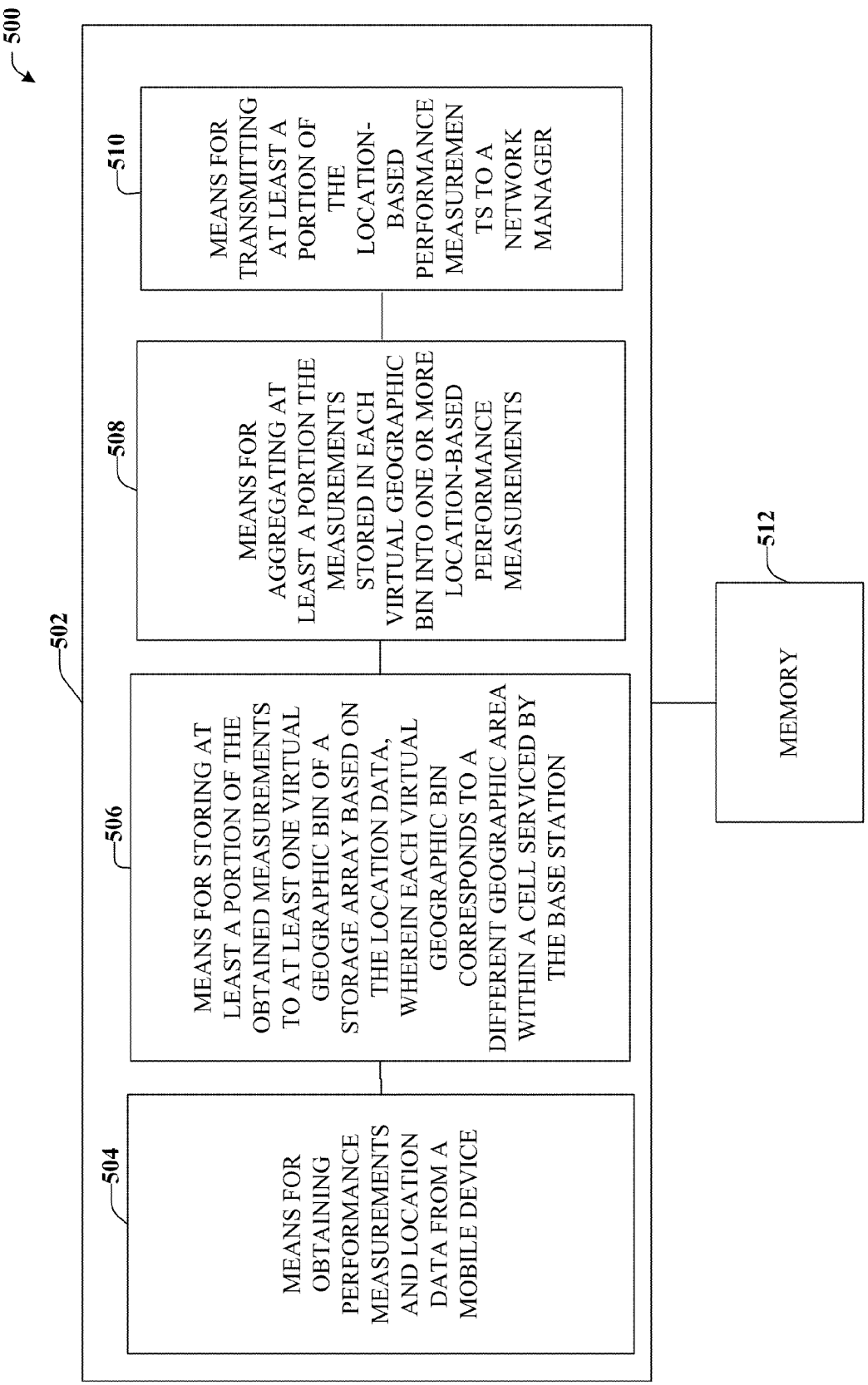
FIG. 5 depicts a block diagram of an exemplary system that can generate performance measurements for a wireless network.

With reference to FIG. 5, illustrated is a system 500 that facilitates generating performance measurements for a wireless network. For example, system 500 can reside at least partially within a base station, mobile device, etc. According to another example aspect, system 500 can reside at least partially within a NodeB. It is to be appreciated that system 500 is represented as including functional blocks, which can be functional blocks that represent functions implemented by a processor, software, or combination thereof (e.g., firmware). System 500 includes a logical grouping 502 of means that can act in conjunction. For instance, logical grouping 502 can include means for obtaining performance measurements and location data from a mobile device 504. For example, a mobile device may transmit performance measurement data such as, received signal power at the wireless device per base station, carrier to interference ratio for each base station accessible to the wireless device, wireless device transmission power, block header rate, wireless device buffer status, call drop status, etc, along with location data, such as GPS or the like. Further, logical grouping 502 can comprise means for storing at least a portion of the obtained measurements to at least one virtual geographic bin of a storage array based on the location data, wherein each virtual geographic bin corresponds to a different geographic area within a cell serviced by the base station 506. For example, the storage array may be defined with bins corresponding to geographic areas laid out in a geographic region. In one aspect, the geographic areas may be uniformly distributed throughout the geographic region, such as in a grid or checker board pattern. In another aspect, the geographic areas may be non-uniformly distributed with a greater grid density in a predefined location. In another aspect, a defining grid may be made through a polar coordinate system, with a base station as the center. Further, logical grouping 502 can comprise means for aggregating, at the base station, at least a portion the measurements stored in each virtual geographic bin into one or more location-based performance measurements 508. For example, data may be aggregated until a trigger event occurs. For example, a triggering event may include: a predetermined time period, a predetermined number of wireless device entries have been received, a predetermined number of a specific performance measurement entry have been received, a network manager request, or the like. Further, logical grouping 502 can comprise means for transmitting, from the base station, at least a portion of the location-based performance measurements to a network manager 510. Additionally, system 500 can include a memory 512 that retains instructions for executing functions associated with the means 504, 506, 508 and 510. While shown as being external to memory 512, it is to be understood that one or more of the means 504, 506, 508 and 510 can exist within memory 512.

Figure 6:
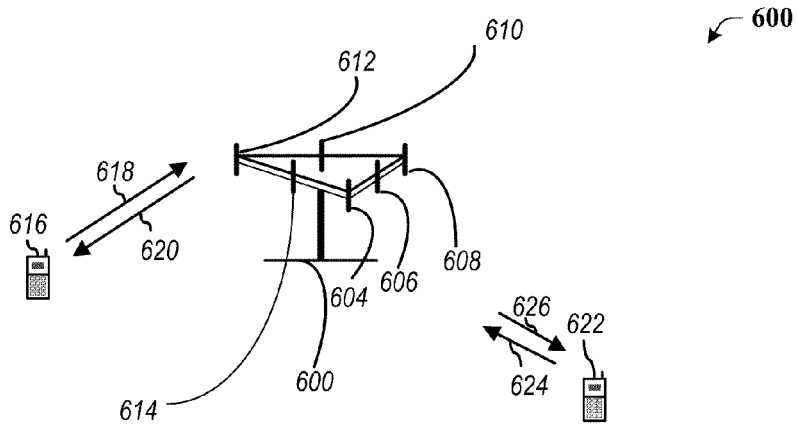
FIG. 6 illustrates an exemplary multiple access wireless communication system according to an aspect.

Referring to FIG. 6, a multiple access wireless communication system according to one aspect is illustrated. An access point 600 (AP) includes multiple antenna groups, one including 604 and 606, another including 608 and 610, and an additional including 612 and 614. In FIG. 6, only two antennas are shown for each antenna group, however, more or fewer antennas may be utilized for each antenna group. Access terminal 616 (AT) is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequency for communication. For example, forward link 620 may use a different frequency then that used by reverse link 618.

Each group of antennas and/or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 624. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 7:
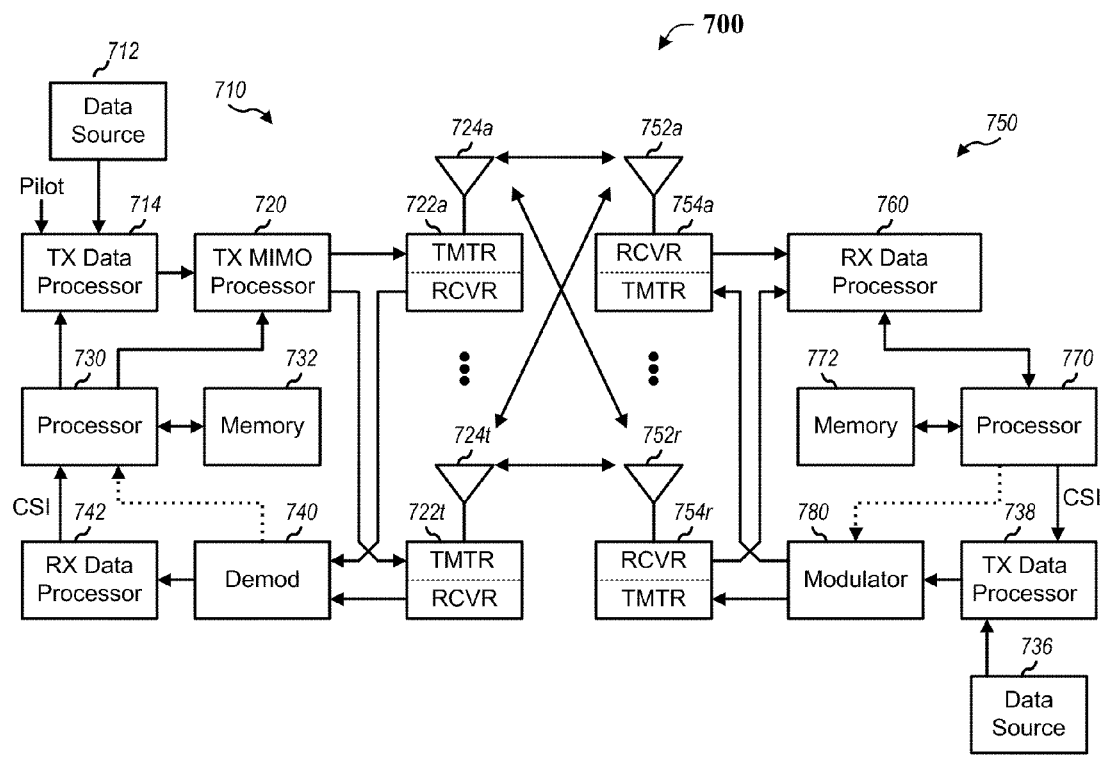
FIG. 7 depicts a block diagram of an exemplary communication system.

Referring to FIG. 7, a block diagram of an aspect of a transmitter system 710 (also known as the access point) and a receiver system 750 (also known as access terminal) in a MIMO system 700 is illustrated. At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain aspects, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels may comprise:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)
The UL PHY Channels comprises:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations may apply:
  AM Acknowledged Mode
  AMD Acknowledged Mode Data
  ARQ Automatic Repeat Request
  BCCH Broadcast Control CHannel
  BCH Broadcast CHannel
  C- Control-
  CCCH Common Control CHannel
  CCH Control CHannel
  CCTrCH Coded Composite Transport Channel
  CP Cyclic Prefix
  CRC Cyclic Redundancy Check
  CTCH Common Traffic CHannel
  DCCH Dedicated Control CHannel
  DCH Dedicated CHannel
  DL DownLink
  DSCH Downlink Shared CHannel
  DTCH Dedicated Traffic CHannel
  FACH Forward link Access CHannel
  FDD Frequency Division Duplex
  L1 Layer 1 (physical layer)
  L2 Layer 2 (data link layer)
  L3 Layer 3 (network layer)
  LI Length Indicator
  LSB Least Significant Bit
  MAC Medium Access Control
  MBMS Multmedia Broadcast Multicast Service
  MCCH MBMS point-to-multipoint Control CHannel
  MRW Move Receiving Window
  MSB Most Significant Bit
  MSCH MBMS point-to-multipoint Scheduling CHannel
  MTCH MBMS point-to-multipoint Traffic CHannel
  PCCH Paging Control CHannel
  PCH Paging CHannel
  PDU Protocol Data Unit
  PHY PHYsical layer
  PhyCH Physical CHannels
  RACH Random Access CHannel
  RLC Radio Link Control
  RRC Radio Resource Control
  SAP Service Access Point
  SDU Service Data Unit
  SHCCH SHared channel Control CHannel
  SN Sequence Number
  SUFI SUper FIeld
  TCH Traffic CHannel
  TDD Time Division Duplex
  TFI Transport Format Indicator
  TM Transparent Mode
  TMD Transparent Mode Data
  TTI Transmission Time Interval
  U- User-
  UE User Equipment
  UL UpLink
  UM Unacknowledged Mode
  UMD Unacknowledged Mode Data
  UMTS Universal Mobile Telecommunications System UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for generating performance measurements for a wireless network, the method comprising:
    obtaining, at a base station, performance measurements and location data from a mobile device;
    storing, at the base station and based on the location data, at least a portion of the obtained measurements to at least one virtual geographic bin of a storage array to define stored measurements, wherein each virtual geographic bin corresponds to a different geographic area within a cell serviced by the base station;
    aggregating, at the base station, at least a portion of the stored measurements stored in each virtual geographic bin into one or more location-based performance measurements including summarizing the at least a portion of the stored measurements in a condensed form; and
    transmitting, from the base station, at least a portion of the location-based performance measurements to a network manager.

2. The method of claim 1 further comprising removing information individually identifying the mobile device from the received performance measurements.

3. The method of claim 1 further comprising receiving information from the network manager, in response to the transmitted data, prompting the base station to redefine at least one of the defined geographic regions.

4. The method of claim 1 wherein obtaining performance measurements and location data from a mobile device further comprises:
    configuring, at the base station, the mobile device to measure coverage and service quality and location data and report the measurements to the base station; and
    receiving, at the base station, coverage and service quality measurements and location data from the mobile device.

5. The method of claim 1, wherein the aggregating further comprises aggregating at least a portion of the stored measurements from multiple virtual geographic bins to generate the one or more location-based performance measurements.

6. The method of claim 1, further comprising:
    formatting, at the base station, the location-based performance measurements into a performance measurement file, wherein the performance measurement file is formatted to be recognizable by the network manager; and
    wherein the transmitting further comprises transmitting at least a portion of the performance measurement file to the network manager.

7. The method of claim 1, wherein the performance measurements include at least one of:
    received signal power at the wireless device per base station accessible to the wireless device; or
    carrier to interference ratio for each base station accessible to the wireless device; or
    wireless device transmission power; or
    wireless device block header rate; or
    wireless device buffer status; or
    call drop status.

8. The method of claim 1, wherein the location data includes latitude and longitude data or network location data.

9. The method of claim 1, wherein the storing further comprises storing the at least a portion of the performance measurements in the virtual geographic bin as the performance measurements are received.

10. The method of claim 1, wherein each virtual geographic bin is logically divided into multiple time periods and wherein the storing further comprises storing the at least a portion of the performance measurements in a selected division of each virtual geographic bin according to the time the performance measurements were received.

11. The method of claim 1, wherein the defined geographic area corresponding to the virtual geographic bins are contiguously and uniformly distributed across the cell serviced by the base station.

12. The method of claim 1, wherein the virtual geographic bins are contiguously distributed through defined Cartesian coordinates corresponding to directions defined through the cell serviced by the base station.

13. The method of claim 1, wherein the virtual geographic bins are contiguously distributed through the cell serviced by the base station with defined polar coordinates centered at the base station.

14. The method of claim 1, wherein the virtual geographic bins are contiguously distributed non-uniformly across the cell serviced by the base station, with a greater density of virtual geographic bins at one or more identified locations.

15. The method of claim 1, wherein transmitting the at least a portion of the location-based performance measurements further comprises:
    determining if a triggering event has occurred; and
    upon a determination that the triggering event has occurred, preparing the at least a portion of the location-based performance measurements to be transmitted.

16. The method of claim 15, wherein the triggering event includes at least one of:

passage of a duration of time; or reception, in the storage array, of a number of entries; or reception, in the storage array, of a number of at least one performance measurement entry; or reception of a request from the network manager.

17. The method of claim 1, wherein the transmitting further comprises transmitting across a backhaul communication link, wherein based on the stored measurements being aggregated, an amount of backhaul traffic data associated with the transmitting across the backhaul communication link is reduced relative to an un-aggregated form of the stored measurements.

18. The method of claim 1, further comprising receiving a configuration change from the network manager, wherein the configuration change is based on the aggregated performance measurements, and wherein the configuration change improves a network coverage or a network capacity.

19. The method of claim 1, further comprising receiving a configuration change from the network manager, wherein the configuration change is based on the aggregated performance measurements, and wherein the configuration change comprises at least one of an antenna tilt or an azimuth change.

20. The method of claim 1, further comprising receiving a configuration change from the network manager, wherein the configuration change is based on the aggregated performance measurements, and wherein the configuration change changes at least one of capacity dimensioning or budget planning.

21. At least one processor configured to generate performance measurements for a wireless network:
   a first module for obtaining, at a base station, performance measurements and location data from a mobile device;
   a second module for storing, at the base station and based on the location data, at least a portion of the obtained measurements to at least one virtual geographic bin of a storage array to define stored measurements, wherein each virtual geographic bin corresponds to a different geographic area within a cell serviced by the base station;
   a third module for aggregating, at the base station, at least a portion of the stored measurements stored in each virtual geographic bin into one or more location-based performance measurements including summarizing the at least a portion of the stored measurements in a condensed form; and
   a fourth module comprising hardware for transmitting, from the base station, at least a portion of the location-based performance measurements to a network manager.

22. A computer program product, comprising:
   a non-transitory computer-readable medium comprising:
      a first set of codes for causing a computer to obtain performance measurements and location data from a mobile device;
      a second set of codes for causing the computer to store at least a portion of the obtained measurements to at least one virtual geographic bin of a storage array based on the location data to define stored measurements, wherein each virtual geographic bin corresponds to a different geographic area within a cell serviced by the base station;
      a third set of codes for causing the computer to aggregate at least a portion of the stored measurements stored in each virtual geographic bin into one or more location-based performance measurements including summarizing the at least a portion of the stored measurements in a condensed form; and
      a fourth set of codes for causing the computer to transmit at least a portion of the location-based performance measurements to a network manager.

23. An apparatus, comprising:
   means for obtaining, at a base station, performance measurements and location data from a mobile device;
   means for storing, at the base station and based on the location data, at least a portion of the obtained measurements to at least one virtual geographic bin of a storage array to define stored measurements, wherein each virtual geographic bin corresponds to a different geographic area within a cell serviced by the base station;
   means for aggregating, at the base station, at least a portion of the stored measurements stored in each virtual geographic bin into one or more location-based performance measurements including means for summarizing the at least a portion of the stored measurements in a condensed form; and
   means for transmitting, from the base station, at least a portion of the location-based performance measurements to a network manager.

24. An apparatus, comprising:
   a receiver operable to obtain performance measurements and location data from a mobile device;
   a storage module operable to store at least a portion of the obtained measurements to at least one virtual geographic bin of a storage array based on the location data to define stored measurements, wherein each virtual geographic bin corresponds to a different geographic area within a cell serviced by the base station;
   a processing module operable to aggregate at least a portion of the stored measurements stored in each virtual geographic bin into one or more location-based performance measurements including summarizing the at least a portion of the stored measurements in a condensed form; and
   a transmitter operable to transmit at least a portion of the location-based performance measurements to a network manager.

25. The apparatus of claim 24, wherein the storage module is further operable to remove information individually identifying the mobile device from the received performance measurements.

26. The apparatus of claim 24 further comprising a configuration module operable to configure the mobile device to measure performance measurements including at least coverage and service quality and location data and report the measurements to the base station.

27. The apparatus of claim 24, wherein the processing module is further operable to aggregate at least a portion of the stored measurements from multiple virtual geographic bins to generate the one or more location-based performance measurements.

28. The apparatus of claim 24, wherein the processing module is further operable to format the location-based performance measurements into a performance measurement file, wherein the performance measurement file is formatted to be recognizable by the network manager; and
   wherein the transmitter is further operable to transmit at least a portion of the performance measurement file to the network manager.

29. The apparatus of claim 24, wherein the receiver is further operable to receive information from the network manager, in response to the transmitted data, prompting the base station to redefine at least one of the defined geographic regions.

30. The apparatus of claim 24, wherein the performance measurements include at least one of:
- received signal power at the wireless device per base station accessible to the wireless device; or
- carrier to interference ratio for each base station accessible to the wireless device; or
- wireless device transmission power; or
- wireless device block header rate; or
- wireless device buffer status; or
- call drop status.

31. The apparatus of claim 24, wherein the location data includes latitude and longitude data or network location data.

32. The apparatus of claim 24, wherein the storage module is further operable for storing the at least a portion as the performance measurements in the virtual geographic bin as the performance measurements are received.

33. The apparatus of claim 24, wherein the processing module is further operable for:
- logically dividing each virtual geographic bin into multiple time periods; and
- storing the at least a portion as the performance measurements in a selected division of the virtual geographic bin according to the time the performance measurements were received.

34. The apparatus of claim 24, wherein the defined geographic area corresponding to the virtual geographic bins are contiguously and uniformly distributed across the cell serviced by the base station.

35. The apparatus of claim 24, wherein the virtual geographic bins are contiguously distributed through defined Cartesian coordinates corresponding to directions defined through the cell serviced by the base station.

36. The apparatus of claim 24, wherein the virtual geographic bins are contiguously distributed through the cell serviced by the base station with defined polar coordinates centered at the base station.

37. The apparatus of claim 24, wherein the virtual geographic bins are contiguously distributed non-uniformly across the cell serviced by the base station, with a greater density of virtual geographic bins at one or more identified locations.

38. The apparatus of claim 24, furthering comprising a reporting module operable to:
- determine if a triggering event has occurred; and
- upon a determination that the triggering event has occurred, prepare the at least a portion of the location-based performance measurements to be transmitted.

39. The apparatus of claim 38, wherein the triggering event includes at least one of:
- passage of a duration of time; or
- reception, in the storage array, of a number of entries; or
- reception, in the storage array, of a number of at least one performance measurement entry; or
- reception of a request from the network manager.

40. The apparatus of claim 24, wherein the transmitter is further operable to transmit the at least a portion of the location-based performance measurements across a backhaul communication link, wherein based on the stored measurements being aggregated, an amount of backhaul traffic data associated with the transmitting across the backhaul communication link is reduced relative to an un-aggregated form of the stored measurements.

41. The apparatus of claim 24, wherein the receiver is further operable to receive a configuration change from the network manager, wherein the configuration change is based on the aggregated performance measurements, and wherein the configuration change improves a network coverage or a network capacity.

42. The apparatus of claim 24, wherein the receiver is further operable to receive a configuration change from the network manager, wherein the configuration change is based on the aggregated performance measurements, and wherein the configuration change comprises at least one of an antenna tilt or an azimuth change.

43. The apparatus of claim 24, wherein the receiver is further operable to receive a configuration change from the network manager, wherein the configuration change is based on the aggregated performance measurements, and wherein the configuration change changes at least one of capacity dimensioning or budget planning.

44. A method for generating performance measurements for a wireless network, the method comprising:
- obtaining, at a base station, performance measurements and location data from a mobile device;
- storing, at the base station and based on the location data, at least a portion of the obtained measurements to at least one virtual geographic bin of a storage array to define stored measurements, wherein each virtual geographic bin corresponds to a different geographic area within a cell serviced by the base station;
- aggregating, at the base station, at least a portion of the stored measurements stored in each virtual geographic bin into one or more location-based performance measurements;
- transmitting, from the base station, at least a portion of the location-based performance measurements to a network manager; and
- receiving a configuration change from the network manager, wherein the configuration change is based on the aggregated performance measurements and comprises at least one of an antenna tilt or an azimuth change.

45. The method of claim 44, further comprising receiving information from the network manager, in response to the transmitted data, prompting the base station to redefine at least one of the defined geographic regions.

46. The method of claim 44, wherein the aggregating further comprises aggregating at least a portion of the stored measurements from multiple virtual geographic bins to generate the one or more location-based performance measurements.

47. The method of claim 44, wherein each virtual geographic bin is logically divided into multiple time periods and wherein the storing further comprises storing the at least a portion of the performance measurements in a selected division of each virtual geographic bin according to the time the performance measurements were received.

48. The method of claim 44, wherein the defined geographic area corresponding to the virtual geographic bins are contiguously and uniformly distributed across the cell serviced by the base station.

49. The method of claim 44, wherein the virtual geographic bins are contiguously distributed through defined Cartesian coordinates corresponding to directions defined through the cell serviced by the base station.

50. The method of claim 44, wherein the virtual geographic bins are contiguously distributed through the cell serviced by the base station with defined polar coordinates centered at the base station.

51. The method of claim 44, wherein the virtual geographic bins are contiguously distributed non-uniformly across the cell serviced by the base station, with a greater density of virtual geographic bins at one or more identified locations.

52. At least one processor configured to generate performance measurements for a wireless network:
- a first module for obtaining, at a base station, performance measurements and location data from a mobile device;
- a second module for storing, at the base station and based on the location data, at least a portion of the obtained measurements to at least one virtual geographic bin of a storage array to define stored measurements, wherein each virtual geographic bin corresponds to a different geographic area within a cell serviced by the base station;
- a third module for aggregating, at the base station, at least a portion of the stored measurements stored in each virtual geographic bin into one or more location-based performance measurements;
- a fourth module comprising hardware for transmitting, from the base station, at least a portion of the location-based performance measurements to a network manager; and
- a fifth module for receiving a configuration change from the network manager, wherein the configuration change is based on the aggregated performance measurements and comprises at least one of an antenna tilt or an azimuth change.

53. A computer program product, comprising:
a non-transitory computer-readable medium comprising:
- a first set of codes for causing a computer to obtain performance measurements and location data from a mobile device;
- a second set of codes for causing the computer to store at least a portion of the obtained measurements to at least one virtual geographic bin of a storage array based on the location data to define stored measurements, wherein each virtual geographic bin corresponds to a different geographic area within a cell serviced by the base station;
- a third set of codes for causing the computer to aggregate at least a portion of the stored measurements stored in each virtual geographic bin into one or more location-based performance measurements;
- a fourth set of codes for causing the computer to transmit at least a portion of the location-based performance measurements to a network manager; and
- a fifth set of codes for causing the computer to receive a configuration change from the network manager, wherein the configuration change is based on the aggregated performance measurements and comprises at least one of an antenna tilt or an azimuth change.

54. An apparatus, comprising:
means for obtaining, at a base station, performance measurements and location data from a mobile device;
means for storing, at the base station and based on the location data, at least a portion of the obtained measurements to at least one virtual geographic bin of a storage array to define stored measurements, wherein each virtual geographic bin corresponds to a different geographic area within a cell serviced by the base station;
means for aggregating, at the base station, at least a portion of the stored measurements stored in each virtual geographic bin into one or more location-based performance measurements;
means for transmitting, from the base station, at least a portion of the location-based performance measurements to a network manager; and
means for receiving a configuration change from the network manager, wherein the configuration change is based on the aggregated performance measurements and comprises at least one of an antenna tilt or an azimuth change.

55. An apparatus, comprising:
- a receiver operable to obtain performance measurements and location data from a mobile device;
- a storage module operable to store at least a portion of the obtained measurements to at least one virtual geographic bin of a storage array based on the location data to define stored measurements, wherein each virtual geographic bin corresponds to a different geographic area within a cell serviced by the base station;
- a processing module operable to aggregate at least a portion of the stored measurements stored in each virtual geographic bin into one or more location-based performance measurements; and
- a transmitter operable to transmit at least a portion of the location-based performance measurements to a network manager;
- wherein the receiver is operable to receive a configuration change from the network manager, wherein the configuration change is based on the aggregated performance measurements and comprises at least one of an antenna tilt or an azimuth change.

56. The apparatus of claim 55, wherein the receiver is further operable to receive information from the network manager, in response to the transmitted data, prompting the base station to redefine at least one of the defined geographic regions.

57. The apparatus of claim 55, wherein the processing module is further operable to aggregate at least a portion of the stored measurements from multiple virtual geographic bins to generate the one or more location-based performance measurements.

58. The apparatus of claim 55, wherein each virtual geographic bin is logically divided into multiple time periods and wherein the storing further comprises storing the at least a portion of the performance measurements in a selected division of each virtual geographic bin according to the time the performance measurements were received.

59. The apparatus of claim 55, wherein the defined geographic area corresponding to the virtual geographic bins are contiguously and uniformly distributed across the cell serviced by the base station.

60. The apparatus of claim 55, wherein the virtual geographic bins are contiguously distributed through defined Cartesian coordinates corresponding to directions defined through the cell serviced by the base station.

61. The apparatus of claim 55, wherein the virtual geographic bins are contiguously distributed through the cell serviced by the base station with defined polar coordinates centered at the base station.

62. The apparatus of claim 55, wherein the virtual geographic bins are contiguously distributed non-uniformly across the cell serviced by the base station, with a greater density of virtual geographic bins at one or more identified locations.

* * * * *